Feb. 26, 1952  H. P. O. SCHLUTER  2,587,000
CAP FOR GREASE FITTINGS
Filed Feb. 13, 1951

INVENTOR.
HERBERT P. O. SCHLUTER
BY
McMorrow, Berman + Davidson
ATTORNEYS

Patented Feb. 26, 1952

2,587,000

UNITED STATES PATENT OFFICE 2,587,000

CAP FOR GREASE FITTINGS

Herbert P. O. Schluter, Brooklyn, N. Y.

Application February 13, 1951, Serial No. 210,724

4 Claims. (Cl. 184—88)

This invention relates to caps for grease fittings and more particularly to caps for the types of grease fittings supplied under the tradenames of "Zerk" and "Alemite" and installed as standard equipment on most modern vehicles and machines.

It is among the objects of the invention to provide an improved cap for a commercial pressure lubricating fitting of the character indicated above which is spring engaged with the fitting and is easy to apply and remove, yet will not be accidentally lost from the fitting; which tightly seals the fitting against the entry of dust, grit and moisture when the cup is in place on the fitting; which assists in locating the various grease fittings on a vehicle or other machine for lubrication; which can be applied in restricted spaces and does not materially increase the size of the outwardly projecting portion of the fitting or interfere with the movements of vehicle or machine parts adjacent the fitting; and which is simple and durable in construction, economical to manufacture and neat and attractive in appearance.

Other objects and advantages will become apparent from a consideration of the following description and the appended claims in conjunction with the accompanying drawing wherein:

Figure 1:
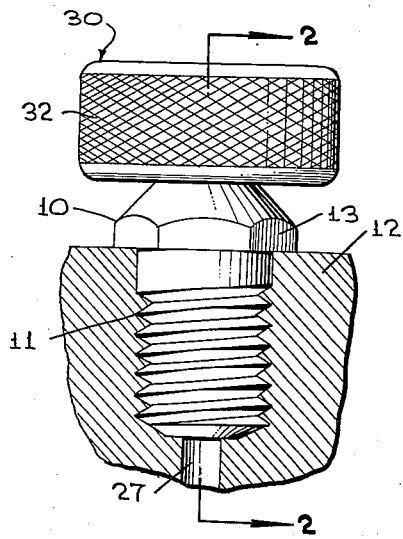
Figure 1 is a side elevational view of a grease fitting shown mounted in a vehicle or machine part and with a cap illustrative of the invention operatively applied thereto.
Figure 2:
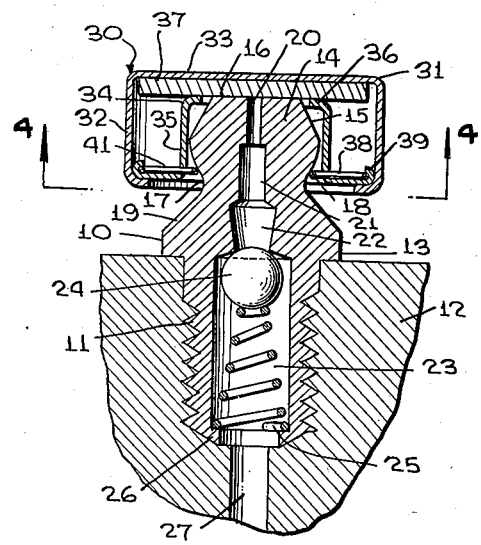
Figure 2 is a cross sectional view on the line 2—2 of Figure 1.
Figure 3:
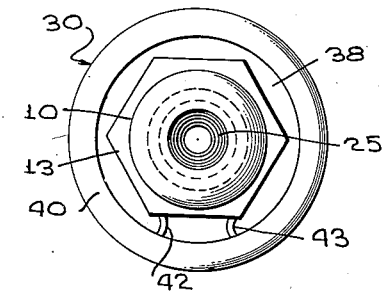
Figure 3 is a bottom plan view of the fitting and cap.
Figure 4:
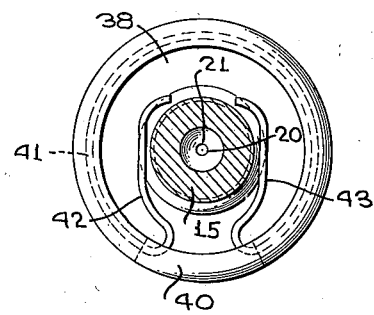
Figure 4 is a cross sectional view on the line 4—4 of Figure 2.

With continued reference to the drawing, the pressure lubricating, grease fitting 10 has a shank 11 which may be externally screw threaded and threaded into a bore provided in a machine or vehicle part 12 or may be made smooth and press fitted into the bore, if desired. In the form of fitting illustrated, a shoulder 13 of polygonal shape having wrench engaging faces thereon is provided at the proximal end of the shank 11 and a grease gun receiving head 14 is provided at the side of the polygonal enlargement 13 remote from the shank. This head has a flat distal end substantially perpendicular to the longitudinal center line of the fitting and of a diameter less than the maximum diameter of the head and a beveled annular or partly conical face 15 tapering from a location substantially at the mid-length of the head to the distal end surface 16. A neck 17 is provided between the head and the enlargement 13 at the proximal end of the head and the head is provided with a rounded annular surface 18 tapering from the adjacent larger end of the surface 15 to the neck 17. The enlargement 13 is provided with a partly conical, annular surface 19 tapering from the side of the enlargement remote from the shank 11 to the neck 17.

The fitting is provided with a coaxial bore 20 which is successively increased in size from the distal end of the head to the shank by the counterbores 21, 22 and 23. The counterbore 23 is the largest in diameter and occupies substantially the entire length of the shank 11. A check ball 24 is disposed in the counterbore 23 and resiliently urged against the end of this counterbore at the proximal end of the shank to close the counterbore 22 by a compression spring 25 disposed in the counterbore 23 and acting between the ball 24 and an internal annular shoulder 26 extending inwardly of the counterbore 23 at the distal end of the shank and providing a seat for the corresponding end of the compression spring.

From the distal end of the shank 11 a suitable bore or aperture 27 leads through the machine part 12 to a bearing, not illustrated.

As the grease fitting 10 is of well known construction, a further illustration and description thereof is considered unnecessary for the purposes of the present disclosure.

The cap of the present invention is generally indicated at 30 and comprises a shell or housing 31 having an externally knurled cylindrical wall 32 closed at one end by a flat end wall 33 disposed substantially perpendicular to the longitudinal center line or axis of the cylindrical wall 32. The inside diameter of the cylindrical wall 32 of the shell 31 is materially greater than the maximum diameter of the head 14 of the grease fitting and a gasket and spring retainer 34 is disposed within the shell 31 and has an annular or cylindrical wall 35 which is preferably coaxial with the cylindrical wall 32 of the shell and loosely receives the head 14 of the grease fitting.

At the end of the annular wall 35 adjacent the end wall 33 of the shell, the retainer 34 is provided with an inwardly directed annular flange 36 and a flat disc 37 of gasket material is interposed between the flange 36 and the inner surface of the end wall 33 of the shell. At the other end of its annular wall the retainer is provided with an outwardly extending annular flange 38 the edge or marginal portion of which is beaded over, as indicated at 39. At its open end remote from the end wall 33 the annular wall 32 of the shell is beaded over to provide an inwardly directed annular flange 40 which engages under the marginal portion of the outwardly directed annular flange 38 of the retainer to secure the retainer in the shell and force the flange 36 of the retainer against the adjacent side of the gasket 37 to compress the gasket disc between the flange 36 and the end wall 33 of the shell.

A partly circular wire spring 41 is secured in the marginal bead 39 of the annular flange 38 and provides two arms 42 and 43 which extend inwardly from the bead 39 at respectively opposite sides of the annular wall 35 of the retainer. This annular wall is provided with circumferentially extending slots at diametrically opposed locations thereon adjacent the annular flange 38 in which slots the arms 42 and 43 are respectively received so that these arms may project through the annular wall of the retainer to engage the inwardly tapered surface 18 of the head adjacent the neck 17.

The distance from the spring arms 42 and 43 to the adjacent surface of the disc 37 is somewhat less than the distance from the minimum diameter portion of the neck 17 to the distal end 16 of the head so that, when the spring arms are in engagement with the head adjacent the neck 17 the gasket disc 37 will be firmly pressed against the outer or distal end of the head to prevent foreign material, such as dust, grit or mositure entering the outer end of the bore 20.

The cap may be removed from the head of the grease fitting by a manual pull and may be reinserted on the grease fitting by manual pressure. Because of the engagement of the spring arms with the inwardly tapered under surface of the head, the cap will not be accidentally lost from the fitting, but can be removed without excessive manual effort.

The outer surface of the shell of the cap may be suitably plated or may be painted in a bright and easily visible color to provide a visual indication of the location of the grease fitting on which the cap is mounted to thereby facilitate locating all of the grease fittings during the lubrication of a vehicle or machine.

The entire cap comprises only four simple parts all of which can be quickly and economically produced and assembled by simple stamping and pressing operations so that the cap can be very economically manufactured and this simplicity of construction also obviates any material deterioration of the caps in use so that it should not be necessary to provide any additional caps for a particular vehicle or machine except to replace those lost during lubrication of the vehicle or machine. Even this loss is substantially eliminated by the present invention, since the caps are all permanently magnetized, and, when removed from the grease fittings, will adhere to the metal structure of the machine or vehicle or to the grease gun, so that they will be readily available for replacement on the grease fittings when needed.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a grease fitting having a grease gun receiving head and a neck of reduced diameter at the proximal end of said head, a protective cap for said fitting comprising a cup shaped shell having an internal diameter greater than the maximum diameter of said head, a spring and gasket retainer secured in said shell and having an annular wall dimensioned to loosely receive said head, said retainer having at one end an inwardly directed annular flange and at its other end an outwardly directed annular flange marginally engaging said shell at the open end of the latter and having slots in its annular wall at oppositely disposed locations of the latter and adjacent said outwardly extending annular flange, a disc of gasket material disposed between said one end of said retainer and the closed end of said shell, and a wire spring secured to the outwardly projecting annular flange of said retainer and providing arms extending one through each of said slots to engage said grease fitting at the neck thereof, the distance from said spring arms to the adjacent side of said disc being less than the distance from said neck to the distal end of said head to enable said spring arms to hold said disc firmly against the distal end of said head.

2. In combination with a grease fitting including a shank having an annular enlargement on one end thereof, a head at the side of said enlargement remote from said shank and a neck between said head and said enlargement, said head having beveled annular surfaces tapering respectively from a location intermediate its length to its distal end and said neck, a protective cap receiving said head and comprising a shell having an annular wall, an end wall closing one end of said annular wall and an inwardly directed annular flange at the other end of said annular wall, a spring and gasket retainer disposed within said shell and including an annular wall loosely receiving the grease fitting head, an inwardly directed flange at one end opposed to the end wall of said shell and an outwardly directed flange at its other end marginally engaged by the inwardly directed flange at the open end of said shell to secure said retainer in said shell, a disc of gasket material disposed between the end wall of said shell and the inwardly directed flange of said retainer, and a partly circular wire spring secured to the outwardly directed flange of said retainer marginally of said flange and providing a pair of spring arms disposed at respectively opposite sides of the annular wall of said retainer, the last mentioned annular wall having circumferentially extending slots therein for the passage of said spring arms therethrough to slide over the beveled surfaces of said grease fitting head and engage said fitting adjacent said neck.

3. In combination with a grease fitting including a shank having an annular enlargement on one end thereof, a head at the side of said enlargement remote from said shank and a neck between said head and said enlargement, said head having beveled annular surfaces tapering respectively from a location intermediate its length to its distal end and said neck, a protective cap receiving said head and comprising a shell having an annular wall, an end wall closing one end of said annular wall and an inwardly directed annular flange at the other end of said annular wall, a spring and gasket retainer disposed within said shell and including an annular wall loosely receiving the grease fitting head, an inwardly directed flange at one end opposed to the end wall of said shell and an outwardly directed flange at its other end marginally engaged by the inwardly directed flange at the open end of said shell to secure said retainer in said shell, a disc of gasket material disposed between the end wall of said shell and the inwardly directed flange of said retainer, and a partly circular wire spring secured to the outwardly directed flange of said retainer marginally of said flange and providing a pair of spring arms disposed at respectively opposite sides of the annular wall of said retainer, the last mentioned annular wall having circumferentially extending slots therein for the passage of said spring arms therethrough to slide over the beveled surfaces of said grease fitting head and engage said fitting adjacent said neck, the outwardly directed flange of said retainer being marginally beaded over said partly circular wire spring to secure said spring to said retainer.

4. In combination with a grease fitting having a grease gun receiving head and a neck of reduced diameter at the proximal end of said head, a protective cap for said fitting comprising a cup shaped shell having an internal diameter greater than the maximum diameter of said head, a spring and gasket retainer secured in said shell and having an annular wall dimensioned to loosely receive said head, said retainer having at one end an inwardly directed annular flange and at its other end an outwardly directed annular flange marginally engaging said shell at the open end of the latter and having slots in its annular wall at oppositely disposed locations of the latter and adjacent said outwardly extending annular flange, a disc of gasket material disposed between said one end of said retainer and the closed end of said shell, and a wire spring secured to the outwardly projecting annular flange of said retainer and providing arms extending one through each of said slots to engage said grease fitting at the neck thereof, the distance from said spring arms to the adjacent side of said disc being less than the distance from said neck to the distal end of said head to enable said spring arms to hold said disc firmly against the distal end of said head, said shell being permanently magnetized so that the cap will adhere to a metal structure or object when removed from the associated fitting.

HERBERT P. O. SCHLUTER.

REFERENCES CITED

The following references are of record in the file of this patent:

UNITED STATES PATENTS

| Number | Name | Date |
|---|---|---|
| 1,430,787 | Borque | Oct. 3, 1922 |

FOREIGN PATENTS

| Number | Country | Date |
|---|---|---|
| 678,000 | France | Mar. 17, 1930 |